(12) United States Patent
Tayebi et al.

(10) Patent No.: US 7,316,032 B2
(45) Date of Patent: Jan. 1, 2008

(54) METHOD FOR ALLOWING A CUSTOMER TO PREVIEW, ACQUIRE AND/OR PAY FOR INFORMATION AND A SYSTEM THEREFOR

(76) Inventors: Amad Tayebi, 5 Sequoia Rd., Westford, MA (US) 01886; Ashish K. Mithal, 8 Hatikva Way, North Chelmsford, MA (US) 01863

( * ) Notice: Subject to any disclaimer, the term of this patent is extended or adjusted under 35 U.S.C. 154(b) by 813 days.

(21) Appl. No.: 10/307,832

(22) Filed: Dec. 2, 2002

(65) Prior Publication Data
US 2003/0163724 A1    Aug. 28, 2003

Related U.S. Application Data

(60) Provisional application No. 60/363,989, filed on Mar. 14, 2002, provisional application No. 60/339,015, filed on Feb. 27, 2002.

(51) Int. Cl.
*G00F 21/24* (2006.01)
*H04L 9/00* (2006.01)
*H04K 1/02* (2006.01)
*G06F 21/24* (2006.01)

(52) U.S. Cl. ..................... 726/33; 726/27; 713/193; 705/52

(58) Field of Classification Search .............. None
See application file for complete search history.

(56) References Cited

U.S. PATENT DOCUMENTS

| | | | |
|---|---|---|---|
| 4,462,078 A | 7/1984 | Ross | |
| 4,577,289 A | 3/1986 | Comerford et al. | |
| 4,584,641 A | 4/1986 | Guglielmino | |
| 4,723,284 A | 2/1988 | Munck et al. | |
| 4,734,796 A | 3/1988 | Grynberg et al. | |
| 4,785,361 A | 11/1988 | Brothy | |
| 4,817,140 A | 3/1989 | Chandra et al. | |
| 4,849,836 A | 7/1989 | Kachikian | |
| 4,866,769 A | 9/1989 | Karp | |
| 4,888,800 A | 12/1989 | Marshall et al. | |
| 4,903,296 A | 2/1990 | Chandra et al. | |
| 4,907,093 A | 3/1990 | Ryan | |
| 4,930,158 A | 5/1990 | Vogel | |

(Continued)

OTHER PUBLICATIONS

Cmte. IP Rights . . . , Exec. Summary, The Digital Dilemma . . . , 2000, 1-20, Natl. Acad. Press, Wash, D.C.

(Continued)

*Primary Examiner*—Christopher Revak
(74) *Attorney, Agent, or Firm*—Ashish K. Mithal

(57) ABSTRACT

A method for controlling distribution and access to an information product, said method comprising the steps of: superposing a utility-reducing masking effect on said information product; controlling the presence, absence and/or permanence of said masking effects by the outcome of an interactive communication between a provider and a receiver of said information product. The term information product includes books, video recordings, audio recordings, music, images and multimedia works. The masking effects described in the present invention are of a generally interfering nature and can be superposed on the information object as an overlay, interruption, interference, discontinuity, disturbance or disorientation. The purpose of imposing a masking effect is to derive a masked version of the information product for preview purposes that can be readily distributed to interested customers in an unrestricted manner. The masking effect is removable after conditions for purchase and/or other authorization criteria are met.

25 Claims, 7 Drawing Sheets

U.S. PATENT DOCUMENTS

| | | | |
|---|---|---|---|
| 4,930,160 A | 5/1990 | Vogel | |
| 4,999,806 A | 3/1991 | Chernow et al. | |
| 5,027,396 A | 6/1991 | Platteter et al. | |
| 5,122,754 A | 6/1992 | Gotaas | |
| 5,195,135 A | 3/1993 | Palmer | |
| 5,253,066 A | 10/1993 | Vogel | |
| 5,283,867 A | 2/1994 | Bayley et al. | |
| 5,341,429 A * | 8/1994 | Stringer et al. | 705/52 |
| 5,387,942 A | 2/1995 | Lemelson | |
| 5,412,718 A | 5/1995 | Narasimhalu et al. | |
| 5,509,070 A * | 4/1996 | Schull | 705/54 |
| 5,513,260 A | 4/1996 | Ryan | |
| 5,530,235 A | 6/1996 | Stefik et al. | |
| 5,538,290 A | 7/1996 | Diamond | |
| 5,563,946 A * | 10/1996 | Cooper et al. | 705/56 |
| 5,598,470 A * | 1/1997 | Cooper et al. | 713/165 |
| 5,629,980 A | 5/1997 | Stefik et al. | |
| 5,634,012 A | 5/1997 | Stefik et al. | |
| 5,636,276 A | 6/1997 | Brugger | |
| 5,638,443 A | 6/1997 | Stefik et al. | |
| 5,673,316 A | 9/1997 | Auerbach et al. | |
| 5,689,560 A * | 11/1997 | Cooper et al. | 705/52 |
| 5,715,403 A | 2/1998 | Stefik | |
| 5,737,416 A | 4/1998 | Cooper et al. | |
| 5,757,907 A * | 5/1998 | Cooper et al. | 705/52 |
| 5,757,908 A * | 5/1998 | Cooper et al. | 713/165 |
| 5,826,025 A | 10/1998 | Gramlich | |
| 5,905,800 A | 5/1999 | Moskowitz et al. | |
| 5,933,498 A | 8/1999 | Schneck et al. | |
| 6,012,160 A | 1/2000 | Dent | |
| 6,055,364 A | 4/2000 | Speakman et al. | |
| 6,058,191 A * | 5/2000 | Quan | 380/203 |
| 6,185,686 B1 | 2/2001 | Glover | |
| 6,205,249 B1 | 3/2001 | Moskowitz | |
| 6,216,228 B1 | 4/2001 | Chapman et al. | |
| 6,233,684 B1 | 5/2001 | Stefik et al. | |
| 6,236,971 B1 | 5/2001 | Stefik et al. | |
| 6,246,775 B1 | 6/2001 | Nakamura et al. | |
| 6,310,957 B1 * | 10/2001 | Heller et al. | 380/236 |
| 6,330,672 B1 | 12/2001 | Shur | |
| 6,928,165 B1 * | 8/2005 | Takai | 380/201 |
| 7,068,810 B2 * | 6/2006 | Keating et al. | 382/100 |
| 2001/0022667 A1 * | 9/2001 | Yoda | 358/1.14 |
| 2005/0165657 A1 * | 7/2005 | Aichroth et al. | 705/26 |
| 2007/0043667 A1 * | 2/2007 | Qawami et al. | 705/50 |
| 2007/0056042 A1 * | 3/2007 | Qawami et al. | 726/26 |

OTHER PUBLICATIONS

Cmte. IP Rights . . . , Chp. 5, The Digital Dilemma . . . ,2000, 1-48, Natl. Acad. Press, Wash. D.C.

ContentGuard, The Need for a Rights Language, Tech. White Paper, 2001, 1-12, ContentGuard Holdings.

* cited by examiner

Prior Art
Unrestricted Access Information Distribution Model
Open Box Model

Restricted Access Information Distribution Model
Closed Box Model

METHOD FOR ALLOWING A CUSTOMER TO PREVIEW, ACQUIRE AND/OR PAY FOR INFORMATION AND A SYSTEM THEREFOR

CROSS-REFERENCE TO RELATED APPLICATIONS

This application claims priority under 35 USC 119(e) to the following two (2) provisional applications entitled "A Method for allowing a customer to preview, acquire and/or pay for information and a system therefor" and identified by Ser. No. 60/339,015 filed on Feb. 27, 2002 and Ser. No. 60/363,989 filed on Mar. 14, 2002, the entire disclosures of which are incorporated herein by reference for all purposes.

FIELD OF THE INVENTION

This invention relates to a method for distributing information or electronic content. More particularly this invention relates to a method for distributing an information product or an electronic/digital work, of potential commercial value, to a potential receiver, in a masked or reduced utility configuration and rendering said information product in its original unmasked configuration upon receipt of payment or due consideration.

BACKGROUND OF THE INVENTION

The explosive growth of public and private information networks has revolutionized the way information is stored, accessed and used. The Internet, in particular, holds promise of becoming the ultimate publishing medium and repository for all kinds of information and electronic content.

Information products or electronically published materials are typically distributed in a digital form and recreated on a computer-based system having the capability to recreate (read, display or playback) the electronic content. Information products include books, multimedia works, audio and video recordings, and software. Electronic content offers some inherent advantages over traditional mediums of representation, such as:

a) Electronic content does not have physical weight. However, it needs to be stored on physical media or computer hardware having storage and/or memory capabilities.
b) Multiple copies of a published work need not be stored separately, for mass distribution, and can be generated upon demand.
c) The costs of duplication, reproduction, dissemination and distribution of electronic property or content are considerably reduced compared to traditional methods of printing, publishing and recording.
d) No loss of fidelity or deterioration in quality of display or playback across generations of copies. Almost impossible to differentiate a digital copy from a digital original.

The fact that Intellectual Property (IP) can be embodied in forms which can be copied while owner retains the original, and, the increasing ease with which IP can be represented and stored electronically and distributed in mass quantities, are issues of great concern for content creators and distributors of intellectual property. The inherent advantages and characteristics of electronic content that has been stored in a digital format also pose some formidable challenges in safeguarding the Intellectual Property (IP) rights and other interests of creators, authors and publishers of electronic content. These concerns and challenges primarily arise as electronically stored data can be perfectly reproduced, duplicated and disseminated without payment of due consideration to the content providers, authors or publishers. Also, as digital content can be replicated without a loss in quality from the original, it becomes difficult if not impossible to distinguish between a digital original and a digital copy.

Any unauthorized distribution of electronic content results in loss of revenue to the content provider or publisher and an unpaid royalty to the author or creator. A wide spread practice of unauthorized copying and distributing of electronic content results in a substantial loss of revenue to the content providers as well as authors and creators. A wide spread duplication and unauthorized dissemination of intellectual content through a widely used public medium, such as the Internet, in fact jeopardizes enforceability of the Intellectual Property (IP) ownership rights of the content creators, authors, artists, publishers, studios and content providers across a wide spectrum of industries.

Thus, despite the advantages of digital content in terms of retrieving, accessing and disseminating, representing content or IP in a digital form is not an end in itself, it can only serve the broad interests when the digital representation does not undermine or otherwise dilute the time-limited monopoly granted to the authors or creators of the content by the US Constitution which empowers the law-makers "to promote the progress of science and the useful arts by securing to authors and inventors for limited times exclusive rights in their respective writings and discoveries."

The problems associated with distributing electronic content and deterring unauthorized and unaccounted distribution and usage of such content have been described in the prior art. An excellent review of technical mechanisms and other methods including business models, intended for protecting intellectual property (IP) in digital form, is provided in a published National Research Council Report (NRC), titled *The Digital Dilemma: Intellectual Property in the Information Age* (National Academy Press, Washington, D.C., 2000), authored by the Committee on Intellectual Property Rights and the Emerging Information Infrastructure, convened by the Computer Science and Telecommunications Board (CSTB). This NRC report, herein incorporated by reference, describes various techniques, methods and technologies that have been employed in the prior art for protecting and distributing electronic content.

Although, conventionally IP protection is typically conceived in legal and technical terms, the NRC report underscores the fact that business models can serve as effective means of making digital content available in new ways that can be an effective deterrent to illegitimate uses of IP.

The business models for addressing IP are important due to the long history of dissemination of ideas, information and IP works through public or private sale of information products which enabled the content creators and publishers to be adequately rewarded for their involvement in creative pursuits and the dissemination process. The economic rewards to the content creators and distributors provided the incentive for continuation of the innovation cycle and fostering further creation of new ideas and information products. The dissemination process customarily builds upon a host of independent purchase decisions made by numerous people for purchasing information product(s). Information stored or represented by conventional methods is usually attached to an artifact such as a book, a tape, a cassette or a CD. In order to pass along the information the owner has to loan the artifact to another individual, however, once represented in digital form information can be readily copied and distributed. Digital IP, in a non-protected form, which can be readily passed along while the owner retains the original does not provide a commercial incentive for distributing the same.

Another disincentive for dissemination of digital information is that access is all or nothing. Even when access is provided for examination purposes the same information can be copied and distributed without rewarding the publisher or the creator. Commercial distribution of information without thwarting the economic interests of its creators and publishers is necessary for preserving a vital public domain of ideas, information and creative works for promoting the sciences, arts, humanities and ongoing technological innovation. The difficulty of protecting content that the distributor is trying to seek buyers for is described in the prior art. The following quote from the NRC report illustrates this well—" . . . in the commercial context, overly stringent protection is as bad as inadequate protection: In either extreme—no protection or complete protection (i.e., making content inaccessible)—revenues are zero. Revenues climb with movement away from the extremes; the difficult empirical task is finding the right balance."

How can then a distributor offer an information product for sale or invite a customer for a purchase evaluation when the content once shared can be freely distributed or copied? This is one of the questions that the present invention is directed at answering.

A principal technology that has been used for managing IP and the rights of content creators and distributors is cryptography. Cryptography or "encryption" involves scrambling or "encrypting" digital content and rendering it unusable until a legitimate party can unscramble or "decrypt" it. Encryption facilitates IP management by protecting content against disclosure or modification during transmission and while it is stored. If content is encrypted effectively, copying the files is nearly useless because there is no access to the content without the decryption key.

In "symmetric-key" encryption, the same key is used for both encrypting and decrypting. Information products, such as movies, songs, books, art and similar works can be distributed in an encrypted form while the decrypting key is only provided to authorized users (e.g. paying customers). This technique of distributing content, in a protected form, is customarily employed in cable television with pay-per-view programming where the decrypting key is provided to the paying customers utilizing special hardware (set-top cable box). The encrypted program can be safely broadcast without fear of unauthorized access due to decryption procedure required for viewing the specific pay-per-view programming.

In public-key cryptography, two different keys or "key-pairs" are used—a public key and a private key. Any message encrypted with the public key cannot be decrypted by using the same public key and requires a corresponding private key to decrypt it. Private keys are kept private by individuals, while public keys are made widely available or published. Secret messages intended for the recipient can be encrypted using the recipient public key. Once the message is encrypted, only the recipient, who knows the corresponding private key, can decrypt the message. Software is widely available to generate key pairs that have this property.

A combination of symmetric key and public-key encryption schemes is also used wherein symmetric-key encryption is used to encrypt the message, and then public-key encryption is used to transmit the decryption key to the recipient. Other applications of public key encryption are "digital signatures" and "identity certificates." Digital signatures involve a private signing key.

In the prior art, copy protection and access control schemes rely principally on software-based encryption, hardware keys or a combination thereof. In terms of specific controls these techniques work by:

1. Restricting a user to make additional copies.
2. Requiring special purpose hardware to limit access to digital information.
3. Anchoring content to a single machine.
4. Packaging content in an encrypted container.
5. Attaching usage rights to the content via XML tags.
6. Fingerprinting and Watermarking.

Software-based encryption techniques prevent conventional copying programs from making unauthorized usable copies. Generally, in these protection techniques, the execution of programs or information stored on a storage medium involves the presence of decryption key for display or execution of data. U.S. Pat. No. 5,027,396 ('396) describes a technique for execution protection of a floppy disk using an encrypted password located at an arbitrary location within the data. Other examples of prior art teachings discussed and referred to in '396, incorporated herein by reference, are directed towards copy-protecting disks or storage media in general see for e.g. U.S. Pat. Nos. 4,577,289; 4,462,078; 4,584,641; 4,734,796; 4,785,361; 4,849,836.

In the prior art a technique for restricting access and use of digital information to a particular machine or "anchoring" content to a single machine is described in U.S. Pat. No. 4,817,140 assigned to IBM. This technique is also referred to as hardware based authorization. U.S. Pat. No. 4,732,284 describes a hardware authentication utilizing public-key encryption techniques. Other examples of secure communication systems utilizing encryption or controlled distribution are described in U.S. Pat. Nos. 4,888,800 and 4,999,806.

Combinations of software based method and hardware key are described in U.S. Pat. Nos. 4,866,769 and 4,903,296. A method for preventing copying of a video program is described U.S. Pat. No. 4,907,093. A method of preventing unauthorized duplication of information from one storage medium to another and further restricting the use of information to one or more designated devices is described in U.S. Pat. No. 5,412,718.

U.S. Pat. No. 5,513,260 describes a method and apparatus for copyright protection of various recording media such as compact discs (CDs) utilizing a combination of symmetrical and asymmetrical data encryption to permit the player to handle either copy-protected or non-copy-protected media.

A method for invoking business operations and encouraging purchase of executable and non-executable software for distribution of digital information is disclosed in U.S. Pat. No. 5,509,070. This method requires the user to obtain an ID unique to the user for obtaining access to the advanced features.

Another method of protecting digital information particularly software is making the software product available for a pre-determined and limited time period such that the program is rendered unusable after the expiry of the allowed time-period. Methods and apparatuses for enabling trial period use of software products are covered under U.S. Pat. Nos. 5,563,946, 5,598,470, 5,689,560 and 5,737,416. A limited trial period can be effective for software products; however, it does not provide a solid business model for delivering other digital content such as books, music and movies due to several reasons. Firstly, even a singular use of the content is disincentive enough for paying or purchasing and secondly, once access is provided in a decrypted form it can be readily stored, displayed and distributed after the trial period has expired.

A method and apparatus to create, distribute, sell and control access to digital documents using secure cryptographic envelopes is described in U.S. Pat. No. 5,673,316 assigned to IBM Corporation. This technology has been commercialized under the IBM's trademark CRYPTOLOPE. Cryptolope objects are used for secure, protected delivery of digital content. Cryptographic envelopes can be compared to the other major technical approach to the same problem, secure servers. A cryptolope is a self-contained and self-protecting object and may include a variety of content types including text, images and audio. It can be delivered across a network or placed on a CD-ROM or other storage media and ties the usage conditions (for e.g. price) to the content itself. Commercial information and detailed description of the cryptolope technology can be obtained from the IBM website using the link—http://www.ibm.com/software/security/cryptolope/about.html Other technologies for controlling and distributing electronic content have been developed by Content Guard, Inc. and Xerox Corporation (http:://www.contentguard.com) and have been described in U.S. patent Nos. listed below and herein included by reference—

"Interactive Contents Revealing Storage Device" (U.S. Pat. No. 5,530,235);

"System for Controlling the Distribution and Use of Digital Works" (U.S. Pat. No. 5,629,980);

"System for Controlling the Distribution and Use of Digital Works Having a Free Reporting Mechanism" (U.S. Pat. No. 5,634,012);

"System for Controlling the Distribution and Use of Composite Digital Works" (U.S. Pat. No. 5,638,443);

"System for Controlling the Distribution and Use of Digital Work Having Attached Usage Rights Where the Usage Rights are defined by a Usage Rights Grammar" (U.S. Pat. No. 5,715,403);

"System for Controlling the Distribution and Use of Rendered Digital Works through Watermarking" (U.S. Pat. No. 6,233,684)

"System for Controlling the Distribution and Use of Digital Works Using Digital Tickets." (U.S. Pat. No. 6,236,971);

Technologies to manage, secure, control and automate the flow of content and the access to services over a network are frequently referred to Digital Rights Management (DRM) Technologies. Content Guard is a provider of Digital Rights Management (DRM) technologies through XrML, extensible Rights Markup Language. XrML is a language to specify rights. XrML is an XML based usage grammar for specifying rights and conditions to control the access to digital content and services. Using XrML, the owners and distributors of digital resources (including content, services or software) can identify the parties allowed to use those resources, the rights available to those parties, and the terms and conditions under which rights may be exercised. Other uses of XrML and its application to development of business models for distributing digital content and services over a network or Internet are discussed in Content Guards's White Paper, "The Need for a Rights Language", 2001 (also available on the web at: http://www.xrml.org/reference.asp).

A system for controlling access and distribution of digital property, herein included by reference, is disclosed in U.S. Pat. No. 5,933,498. In this prior art teaching access to protected portions of the data, in a useable form, is prevented. Access to the protected portions of the data is only provided in accordance with rules or access rights as enforced by a mechanism protected by a tamper detection feature.

Once again developing a common language for describing rights and rules for use, duplication and distribution of electronic content is useful in a business context, however, the mechanisms of protection rely on encryption. In addition to encryption, other techniques for protecting digital content include "watermarking and "fingerprinting" The use of watermarks for the purpose of identifying the manufacturer and quality of a paper discreetly is well known. Watermarking techniques have also been employed for preventing forgery of banknotes and checks (see for e.g. U.S. Pat. Nos. 5,122,754 and 5,538,290).

Analogous to paper making digital watermarks can be used to mark each individual copy of a digitized work with information identifying the title, copyright holder, and even the licensed owner of a particular copy. A method and system for digital watermarking is described in U.S. Pat. No. 5,905,800 herein incorporated in its entirety by reference. A method for applying a digital watermark to a content signal is disclosed. The method includes identifying a binary sequence watermarking key and applying the binary sequence to the content signal. The digital watermark is then encoded within the content signal at one or more locations determined by the watermarking key.

Another prior art teaching U.S. Pat. No. 5,195,135 discloses a method and apparatus for the automatic censorship of audio-video programming at the receiver in accordance with a viewer-selected censorship mode and classification data encoded in the audio-video programming signal. The censorship classification data comprise codes that classify the programming for several different subjects and several different censorship levels. Censorship of the audio-video programming is accomplished by automatically obscuring the audio and/or video signal by blurring the audio or video frame.

U.S. Pat. No. 6,216,228, herein incorporated in its entirety by reference, describes a method and a system for automatically controlling display of video or image data in accordance with content classification information embedded in the form of digital watermarks. A controller decodes the watermarked content codes and then prevents displaying of certain material, by overlaying the display with blanking data, if the codes match certain stored codes, which the controller has been set to respond to. The use of invisible digital watermark codes by a controller, which operates in response to the watermark codes, provides reliable control since the codes are more difficult for unauthorized persons to detect and remove than other embedded codes would be. U.S. Pat. No. 6,216,228 is directed towards censorship and screening of sensitive, adult and pornographic content. Other U.S. patents that disclose similar parental control features include for example, U.S. Pat. Nos. 4,930,158; 4,930,160; 5,253,066 and 5,387,942.

Digital watermarks are applied in a variety of ways and for a variety of purposes. Watermarks can vary according to the type of content they are affixed to: text, images, audio or video. Watermarks may be visible or imperceptible to the user. The embedded watermark may be a text, image, signal or a code. Typically watermarks contain information about the provider or publisher. The term fingerprinting is often used to connote marks that carry information about the end user and are essentially employed for tracing information about the user.

Typical uses of digital watermarking and fingerprinting are:

To confirm genuineness and integrity of the content.

To authenticate ownership of a digital work.

To introduce an electronic fingerprint for preventing or tracing piracy or unauthorized duplication.

To mark a digital work, when digital watermark is keeping additional information about the product itself such as time and date stamping of photographs.

For censorship of sensitive content.

The practical applications of watermarking are not so much a deterrent for private copying as an aid to police wide scale commercial pirating of digital content.

Thus, as described herein above, prior art techniques of distributing digital content provide either "complete and open access" or "complete prevention of access". In the former case the content has little commercial value since it is freely distributed, and in the latter case the consumer has to take the leap of faith prior to making a purchase decision. In other words, the techniques for protection against unauthorized use of digital content rely primarily on preventing access to the published work or allowing access to the published work only in an encrypted form and thereby not allowing the customer to preview, display or use the published work without paying for it. Thus, content protection technologies provide mechanisms for Protection of digital data or Rights Management for content creators and distributors; however, they do not necessarily facilitate the purchase decision process for the consumer. The consumer is only granted a very limited access to the preview material for determining if the content under evaluation is a worthwhile purchase.

FIGS. 1a and 1b show conceptual representations of the distribution models based on unrestricted and restricted access schemes respectively.

The unrestricted access scheme, shown in FIG. 1a, is referred to as "Open-Box Model" and denotes free or unrestricted access to the unencrypted content object. The content label on the box analogically describes the contents of the box by—an abstract of the content material or excerpts therefrom or preview of the underlying content. Due to readily available unrestricted access to the unencrypted content object the unencrypted content object has an insignificant commercial value.

The restricted access scheme, shown in FIG. 1b, is referred to as the "Closed-Box Model" and denotes restricted or conditional access to the encrypted content object. The restricted access model referred to as "closed box model" requires certain obligations to be met prior to release or decryption of the encrypted content object. It is worth noting that even if, unrestricted access can be provided to the encrypted content object, it would have little or no utility until it is decrypted.

Consistent with the above Closed-Box Model, the primary method of distribution of commercially valuable electronic or digital content is providing no access to the "content object" or "the body of the document or digital work" unless some form of payment has been received from the user. Generally, an abstract or a few excerpts of the published work are provided to the customer for making a purchase decision and the published work is released in its entirety only after payment has been received from the customer. For example, in offering a book or similar subject matter for sale which, has been published electronically, the content provider or publisher generally provides any one or more of the following items—excerpts from the book, a few chapters of the book, a brief description of the contents, the complete Table of Contents, and/or testimonials of other readers.

However, this method of controlling access to electronic content, prior to a commitment of purchase by the consumer, affects the quality of information available to the user or consumer for making a purchase decision. Thus, in the previous example, the electronic information received or previewed by the reader is of an inferior quality compared to that obtained by the reader during a physical trip to the local bookstore and actually examining the printed book, in its entirety, prior to its purchase.

Developing a system for providing a consumer with electronic content that—is substantially representative of the electronic publication or electronically published content, prior to its sale by the content provider or its purchase by the consumer; and that in addition, does not compromise the commercial value of the electronic content or publication (or render it worthless) offers several challenges:

a) Any attempt at increasing the relevancy between the preview material or "pre-sale electronic content made available for purchase decision" and the "post-sale published electronic content", such that the former is substantially and truly representative of the latter, almost immediately compromises the value of the published electronic content or removes the necessity and the incentive or motivation for its purchase.

b) Relevancy between the "pre-sale electronic content made available for purchase decision" and the "post-sale published electronic content" is dependant on the type of electronic content. Thus, for instance, some relevancy may be attached to pre-sale and post-sale versions of a video recording wherein a muting effect has been applied to the pre-sale video version; applying the same muting effect to a song or an audio recording provides no relevancy at all. It will be recognized by those of ordinary skill that relevance is not absolute but is dependent on the knowledge, interest and motive of the user. A more knowledgeable user can determine relevancy quite readily, while a motivated buyer who for instance needs a textbook recommended by a course-instructor would make a purchase decision without the publisher-supplied information.

c) Other fundamental difficulties in dealing with electronic content are realized in the seemingly endless variety of formats and file structures for representing a given type of electronic content. Virtually, all information that can be represented by words, numbers, graphics, or system of commands and instructions can be formatted into electronic digital information but the final representation, display, or playback devices can vary by the type of data-handling capacity or the quality of output.

d) Electronic content is delivered by various mediums such as Television, Cable, Satellite Transmissions, and On-line services transmitted, over public and private networks including broad distributed network such as the Internet, via telephone lines or through wireless transmissions. The electronic content providers include media and software companies such as AOL Time Warner, Microsoft, Yahoo etc, local and long distance telephone companies such as AT&T, Verizon, Cable companies, Cellular telephone companies, E-mail services, etc. which by their very nature of their enterprises are competitively positioned and adopting a universal standard of content delivery is difficult if not impossible.

From the above, it can be readily established that there is a need for a system, which:

Provides an improved method for offering, displaying and distributing electronic content that provides adequate and relevant exposure to the published electronic content for potential purchase purposes;

Provides the consumer with an improved purchase decision framework regarding the electronically published materials;

Provides increased fidelity or relevance between before-sale and after-sale electronic content by allowing customers to preview the original published electronic content in a substantially deterministic way for making purchases;

Does not compromise the value of the for-sale electronic content by premature disclosure of for-sale electronic publication in its entirety or full-utility configuration.

As will become clear from the ensuing detailed description, in its simplest form the present invention provides for a "Mask" or "Masking Effect" that is superposed on the original content as an "interruption", "discontinuity" and/or "disorientation" with the sole-purpose of providing a preview of the underlying original content but in manner that only suffices for purchase-evaluation purposes and detracts from the wholesome utilization or enjoyment of the digital content. The masking effect is readily removed or removable, once customer meets the obligations or conditions for purchase of the content.

Superposition or overlays have been described in the prior art. A digital Image Overlay System and Method for overlaying one digital image on another digital image is described in U.S. Pat. No. 5,283,867. More particularly this method describes transferring and reformatting a block of image data from a bit-planar organized, source memory and overlaying it onto an image stored in a display target memory. This prior art teaching is particularly directed at image overlays in presentations and picture-to-picture transitions and does not teach a method of physically masking digital content for the purpose of distributing digital content.

A device for distribution of a digital music information object is described in U.S. Pat. No. 5,636,276. The digital music information object is composed of a core and a number of additional layers; wherein, the core includes an encryption table, for interacting with encryption and decryption modules of the system. The additional layers may include audio layer class, score layer class, text layer class and video layer class. Again, this prior art teaching does not describe a masking effect or a masking layer, which is removable at the time of purchase.

A system and method for providing annotation overlays from diverse sources of commentary for World-Wide Web document is disclosed in U.S. Pat. No. 5,826,025. Again, this prior art teaching does not discuss removable masking or overlays as a part of the distribution process.

In the present invention, the problems associated with free, open and uncompensated distribution of electronic content to users or consumers without thwarting the motivation for subsequent purchase are addressed. A system is provided for distributing information or products thereof in a fashion which supports both modes—a payment based mode which makes the electronic content available for paying users and a non-payment based mode for providing content to users for previewing and making a purchase decision.

SUMMARY OF THE INVENTION

An object of the present invention is to provide for and facilitate previewing and distribution of information products and electronic content.

Another object of the present invention is to facilitate protection of intellectual property distributed in an electronic format through a variety of distribution mediums, devices or networks including a multi-node distributed computer network such as the Internet.

Another object of the present invention is to balance the conflicting aspects of—ease of accessibility for preview, by the user, for a purchase determination of given electronic content; and the need of the owners and distributors of information products for protecting and guarding against illegal duplication/proliferation of the same.

An additional object of the present invention, is to provide free and uncompensated access to information products, having a finite commercial value, in a lower or reduced-utility configuration for previewing and enabling the consumer to make meaningful purchase decisions regarding said information products.

According to one of the embodiments of the present invention, these objects are met by superposing a masking layer on an original information product, which reduces its utility. Thus, when a consumer retrieves electronic content for making a decision about purchasing an information product, the consumer encounters a masked version of the for-sale information product which, provides substantial preview access to the original information product albeit in a fashion which deters the user from deriving full utility, education, enjoyment or entertainment from it. By providing preview access to digital data in a lower utility configuration, the distributor preserves the commercial value of the original information product while providing the consumer with decision-enabling content at the same time. The masking layer characteristics are relevant to the type of electronic content—text, audio, video, or a combination thereof—being masked. The masking effect itself can be tangible or intangible, it may contain textual data or audio or video signals that are superposed over the for-sale electronic content. It may be static or dynamic.

Thus, the information product is rendered in a reduced-utility configuration, for previewing, by applying a mask or masking effect that interferes with the original configuration of the information product. The purpose of representing the information product in a reduced-utility configuration is to allow the customer a preview of the electronic work for making a purchase decision; while the original information product in its full-utility configuration is released upon receipt of payment or monetary consideration.

In one specific embodiment of the invention the masking effect is in the form of a plurality of overlays that are displayed at various locations of the information product during its recreation or playback. The overlays are adapted to either static or dynamic. The overlays can themselves be mini-information objects carrying electronic content in the form of written text, drawings, images, animation, audio-visual content etc.

In another embodiment of the invention the masking effect is in the form of a "noise signal" or an interruptive waveform that is applied to audio or video content portions of the information product. The interruptive waveform can be continuous so that it appears throughout the playback of the information product or it may be discontinuous and appearing only at pre-selected intervals for pre-selected durations with specific frequency.

In still another embodiment of the invention the masking effect is in form of a perceptible interference wave that traverses through a portion of the display screen during recreation of an information product.

In a further embodiment of the invention the masking effect is in the form of a blurring effect that is randomly, arbitrarily or selectively applied to the various portions of the information product.

In another embodiment of the invention the masked version of an information product obtained by superposing a masking effect is rendered the default version of the information product. The information product persists in its masked state until a mask-removal procedure is carried out on the information product. After playback or display the information product reverts to its default masked state and re-access to the information product again requires an authentication or approval by the distributor.

Further objects and advantages of this invention will become apparent from a consideration of the accompanying drawings and ensuing description.

DETAILED DESCRIPTION OF THE INVENTION

Figure 1A:
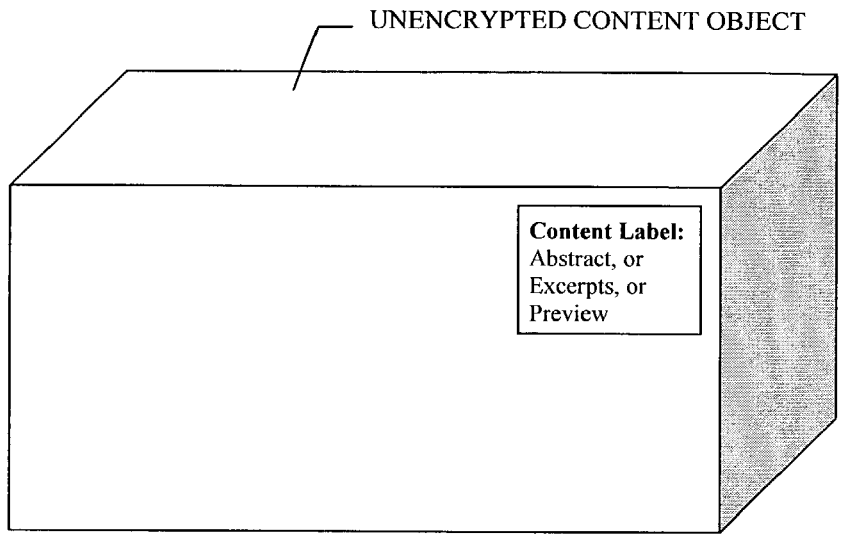
FIG. 1a is a conceptual representation of Prior Art showing the Unrestricted Access Information Distribution Model (Open Box Model).

A method and a system for distributing, downloading and browsing or previewing information products or electronic content is disclosed.

In the following description, various functional aspects of the present invention will be described. However, it will be apparent to those skilled in the art that the present invention has much broader field of application than the exemplary embodiments set forth hereinafter.

Specific examples of digital property distribution-chain configurations; masking effects used for re-representing digital content; and, electronic devices used for connecting, accessing, displaying, reading or playing back electronic content, information or products thereof are provided by way of illustration, in order to provide a thorough understanding of the present invention, and not by way of limitation.

The term computer system is used broadly as a device capable of processing, storing, accessing, and/or displaying information and includes a general purpose as well as special purpose data processing machines and computer systems, that are standalone, adjunct or embedded. The computer system may be programmable using various computer programming languages such as "C++", "Visual Basic" etc. or may be implemented using specially programmed hardware.

Information related terms, such as—data, data packets, files, programs, text, graphics, music, video, flags, bits, values, characters, strings, numbers—describing specific information types, products, representations or elements thereof are used in consistency with their common-use. It will be recognized by those skilled in the art that these data or information representations and other electronic content representations including superimposed masks and masking effects take the form of electrical, magnetic, or optical signals capable of being stored, accessed, copied, transferred, deleted, modified, combined, reproduced, captured, and/or otherwise manipulated through mechanical, electrical and operational components of a computer system.

Various operational elements of the system for distribution of Information and products thereof will be described in a particular order. However, the order of presentation is not necessarily the functional order for accomplishing the invention. All examples of commercial products and reference to them by their respective trade names is done for illustration and clarification purposes; it will be readily recognized by those of ordinary skill that these trade names are the property of their respective owners.

For a comprehensive discussion of the methodology and embodiments of the present invention it will be beneficial to define the various concepts, phrases and instrumentalities utilized in the present invention.

"Information" or "Information Products" or "Electronic Content" are terms that refer broadly to all data that can be represented and transmitted electronically or digitally. A brief list of terms used for describing information and information products is shown in Table I. Strictly speaking an information product is an assembled package that contains information or electronic content.

TABLE I

Terms Used For Describing Information Products
"INFORMATION PRODUCTS" or "ELECTRONIC CONTENT"

| Electronic Content | Digital Content | Information Products |
|---|---|---|
| Electronic Works | Digital Works | Multimedia Works |
| Electronic Publications | Digital Publications | Multimedia Content |
| Electronically Published Works | Digital Property | Information |
| Electronically Published Materials | Data | Information Object |

An information product may include commercial or non-commercial electronic content including books, drawings, images, photographs, audio recordings, songs, video recordings, movies, software programs, multimedia works or interactive games.

Table II shows a simple classification of various electronic content types, in context of this invention. Information products are typically recreated on a computer based-system.

TABLE II

Classification of Information Products By Content Type
CLASSIFICATION BY CONTENT TYPE AND EXAMPLES

| | |
|---|---|
| Printable Matter | Books, B-Books, Magazines, Newspapers, Catalogs, Journals, Research Papers and other Published Materials; Generally, content containing-Alphabets, Letters, Words, Text, Images, Artwork, Figures, Drawings, Graphics, Photographs, Data, Formulas, Equations, Symbols, Spreadsheets, Tables, etc. |
| Audio | Songs, Music, Audio Recordings, Speeches, Radio Programs, Audio Books, Messages; In general-Auditory Content. |

TABLE II-continued

Classification of Information Products By Content Type
CLASSIFICATION BY CONTENT TYPE AND EXAMPLES

| | |
|---|---|
| Video | Movies, Films, Video Recordings, TV Programs, Entertainment, Dance, Animation, Games, Audio-visual Presentations etc. |
| Software and Related Data | Databases, Algorithms, Programs, Executable Applications, Software Templates, CAD Data, 3D Models and Geometry, Electronic Signals, Interactive Content etc. |
| Combinations of the Above | Multimedia Works, Cable, Satellite Transmissions, On-line Content, Digital Works Containing Heterogeneous Digital Elements Or Content Types; |

The term "recreation of an information product" used in this application refers broadly to "print, render, read, display, interpret or playback of an information product" using appropriate means or devices for such recreation. It will be readily understood by those skilled in the art that a recreation of printable matter requires a display device such as a monitor or a printer, however, the reading of a digital file requires a computer system and an interpretive program such as a word processor. Similarly, audio recordings, video recordings and multimedia works require specific hardware and read, interpret, display and/or playback devices for accessing and playing back the same.

"Superposing a masking effect on an information product", or "applying a masking effect or mask on an information product" or simply "masking an information product"—refer to—applying a tangible or an intangible effect on an information product which limits the utility of the information product and renders the information product or at least a portion of the information product, being masked, incomplete, inconvenient, and/or lacking information, data, features, functionality, resolution, clarity, text, graphics, images, audible content or video content.

Masking effects can be seen and/or heard by a user during recreation of an information product, which has a masking effect superposed thereupon. Masking effects are adapted to cause at least one of the following when superposed on an information product—an interruption, a discontinuity, an interference, a distortion, a disorientation and/or a combination thereof. Additionally, masking effects can be superposed in the form of an overlay, an overlay window, a screen, a veil, a noise signal and/or a combination thereof. Masking effects can be adapted to be static or stationary and attached to at least a specific portion of the information product. Masking effects can also be dynamic wherein they are not necessarily attached to a specific portion of the information product but are adapted to appear with random or specific frequency. Masking effects can also adapted to be interference waveforms or noise signals. A masking effect or "a mask" may itself contain electronic content including audio content, video content, written text, pictures, graphics and/or commercial messages which either merges with, overwrites, suppresses, conceals or modifies the information product or portions thereof.

In generic terms, the masking effect generally interferes with the recreation of the information product in its "original and intended form". The "original and intended form" of an information product refers to the original, unmasked information product that was intended for distribution by its creators.

A primary reason for superposing a masking effect or a mask on an information product is for distribution control purposes. Superposition of a mask or masking effect on an information product creates a "reduced utility version" or "masked" version of the information product. Such a masking effect is referred to as a "utility-reducing masking effect". The masked version of the information product provides a preview of the original and intended information product albeit in a form that detracts from wholesome utilization or enjoyment of the information product. Thus, the masked version or a preview version remains substantially representative of the original information product and enables a user in evaluating the information product for making a purchase decision. "Reduced-utility configuration" or "reduced-utility representation" of an information product refers to its preview or masked state in which, the information product is characteristically represented in a fashion that disables its utilization to the fullest degree.

In a typical distribution scheme the distributor of an information product controls the superposition or application of the masking effect. The characteristics of the masking effect including the level, type, content and extent of masking are controllable by the distributor. A distributor of an information product can prescribe criteria for controlling the permanence, absence, removal or duration of the masking effect on the information product.

A utility-reducing masking effect can be adapted to be removable or reversible when a customer meets the prescribed criteria for gaining access to the information product in its original and intended form. Prescribed criteria may include a purchase of the information product or buying a subscription or being an authorized customer of the distributor. Once a customer meets the prescribed or pre-established criteria, access can be granted to the customer.

Alternately, a utility-reducing masking effect can be permanently superposed on an information product to create an irreversible masked version of the information product. Once a masked or preview version is created, the preview version can be freely distributed to a large audience for marketing and offering for sale the original information product.

Terms such as "Content Layering", "Mask Layering" or "Layered Masking" generally connote that masking effects have been imposed on an information product the form of overlays or a plurality of layers. The net effect provided by plurality of layers may be accretive (content addition) or depletive (content hiding) or both—showing content as an overlay which hides the content in the layer below it.

Figure 1B:
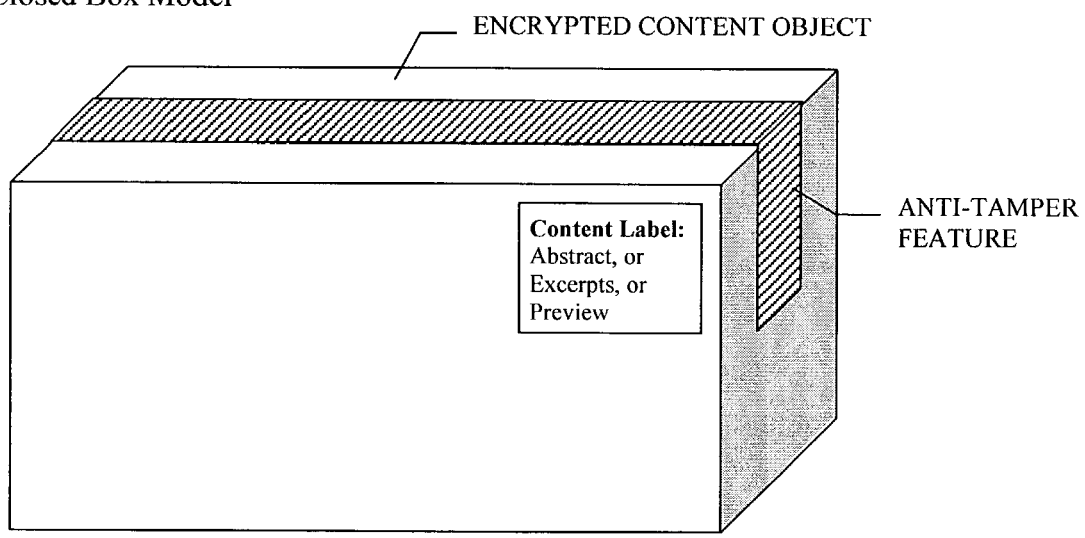
FIG. 1b is a conceptual representation of Prior Art showing the Restricted Access Information Distribution Model (Closed Box Model).

System:

As mentioned hereinabove, various distribution systems for information products have been described in the prior art. Particularly, the commonly used Unrestricted Access and Restricted Access distribution models are shown in FIG. 1a and FIG. 1b, respectively. A key feature of the Restricted Access Information Distribution Model, shown in FIG. 1b, is that information products of commercial value are typically made available only upon exchange of monetary consideration between the user and the distributor or content provider, and as such the user, more often than not, receives little or insufficient information about the product being considered for purchase. This controlled access to the point of prohibiting the user from seeing, hearing or reading what he/she intends to purchase is exercised because of the fact that access to digital information and its subsequent use invariably involves making a copy. In fact, computer programs are run by copying them from disk/storage to memory (RAM, or random access memory); and, web pages are viewed by copying them from a remote computer to a local machine or other display/playback device(s). Thus, the very act of providing access involves copying.

Therefore, regardless of the mechanisms of distribution or information type, the Restricted Access Distribution Model has been based on NO PAYMENT, NO ACCESS (NPNA). The Restricted Access Model does not allow the user to gain access to the main body of the Information product, even for preview or purchase decision purposes. This shortcoming of the restricted access model frequently leads to the consumer behavior of NO PREVIEW ACCESS, NO PURCHASE (NPANP). Thus, in effect both the distributor and the consumer are adversely affected by the restricted access system; the distributor looses revenue due to being unable to attract a sale, while the consumer is prohibited from deriving pleasure or value from the information product. It may be argued that it is such restrictive systems, for distribution of digital content, that have encouraged services like NAPSTER to be created.

The present invention is directed at providing access to digital information or electronic content without compromising its sale value and enabling the user or consumer to make a better purchase decision, and, from the content providers standpoint, to entice the user by providing a controlled access to the information product. In accordance with the present invention access control is exercised by applying a masking effect to an information product so that it can be readily distributed as a preview material, however, complete access can only be provided upon completion of an authentication or purchase procedure established by the distributor.

Figure 2:
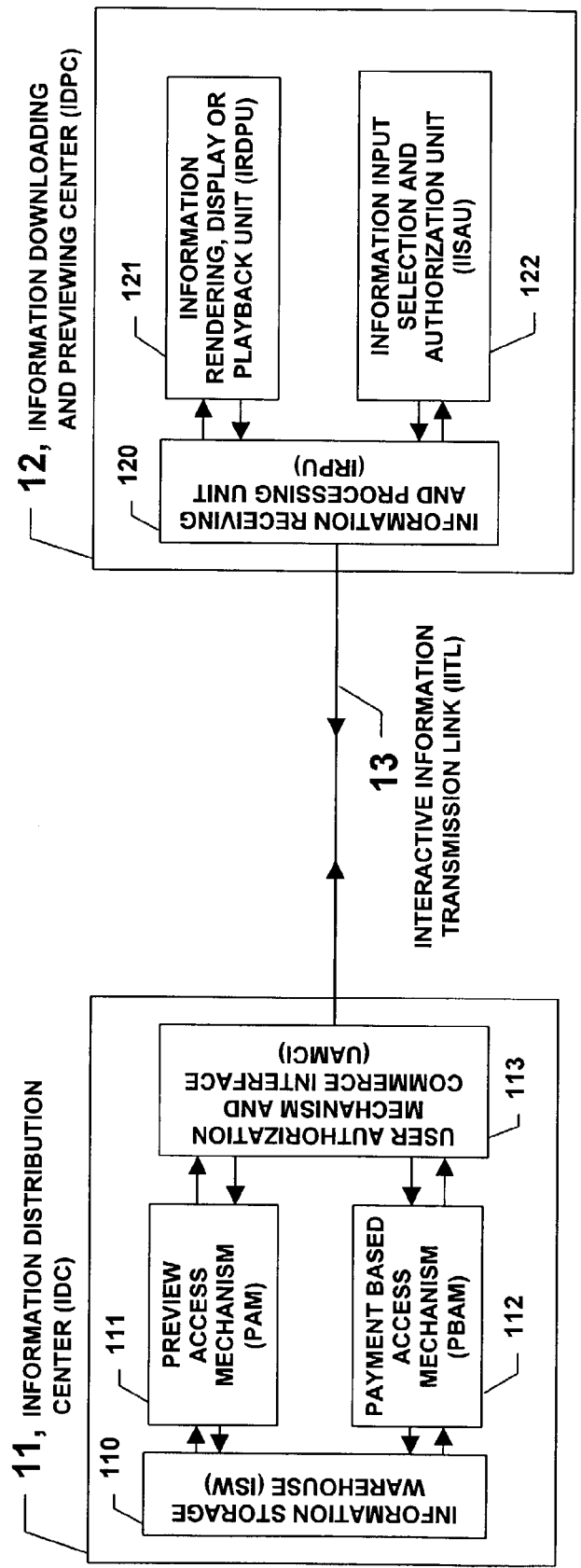
FIG. 2 is a block diagram illustrating the various elements of a Selective Information Distributing, Downloading and Browsing System (SIDDBS) in accordance with an embodiment of the invention.

FIG. 2 shows a Selective Information Distributing, Downloading and Browsing System (SIDDBS) 10, for distribution of information products or electronic content, in accordance with this invention. It will be recognized by those of ordinary skill that information products may be distributed by content creators, authors, musicians, movie directors, sports organizations, singers, paper publishing companies, recording companies, movie studios, TV studios, or other individuals and organizations. SIDDBS 10 has three basic elements comprising of—on the supplier side, an Information Distribution Center (IDC) 11; on the consumer side, an Information Downloading and Previewing Center (IDPC) 12; and an Interactive Information Transmission Link (IITL) 13 therebetween.

IDC 11 has several functions including storage, authentication, payment processing, access management and transmission of information products. These functions can be performed by a singular multi-functional computing device or a computer system. Alternately, the functionalities can be divided between a plurality of computing and storage devices or servers connected together in accordance with known network protocols.

The functions performed by IDC 11, include:

Storing information products or electronic content provided by publisher(s) and/or author(s).

Authenticating users per pre-established criteria including payment confirmation, membership status, and/or account history, etc.

Processing payments and customer purchase requests.

Managing access to information products per user privileges as different users and/or groups may have different privilege rights.

Distributing information products in original or masked form in accordance with authentication and access rights. Thus, for instance a non-paying user will only receive a masked or reduced-utility version of an information product, while a paying user will receive the information product in its original and intended form.

The essential functionalities of IDC 11 are performed by logic processing sub systems or units as shown in FIG. 2. Specifically, these sub-units include an Information Storage Warehouse (ISW) 110, which acts as an information storage facility or data bank; a Preview Access Mechanism (PAM) 111, for processing and distributing derived or masked information products; a Payment Based Access Mechanism (PBAM) 112, for processing and distributing information products in their original and intended form; and a User Authorization Mechanism and Commerce Interface (UAMCI) 113 for authorizing users, processing commerce transactions, and issuing permissions for distribution of information per pre-established criteria such as user-authorization status, account authentication, payment confirmation, digital signature, consumer consent or other qualifying actions established by the distributor.

As shown in FIG. 2 the connection between Information Distribution Center, IDC 11 and the Information Downloading and Previewing Center, IDPC 12 is through an Interactive Information Transmission Link, IITL 13. IITL 13 can be a link via the Internet or the World Wide Web or other communication network(s) including Cable, Telephone, DSL, ADSL, and Modem or Satellite links. Also, in FIG. 2, IDC 11 is shown connected or linked via IITL 13 to a single IDPC 12. It will be recognized by those skilled in the art that IDC 11 can be concurrently and independently connected to a multitude of users having their own Downloading and Preview devices via a variety of interactive communication links operating at various transmission or information-exchange speeds.

At the consumer end, the Information Downloading and Previewing Center, IDPC 12, is a typical computer system and may be a general-purpose computer, which is programmable using a programming language or may use specially programmed hardware.

The IDPC 12 includes an Information Receiving and Processing Unit (IRPU) 120; an Information Rendering, Display, or Playback Unit (IRDPU) 121; and, an Information Input, Selection and Authorization Unit (IISAU) 122.

IRPU 120 is analogous to the central processor and memory devices of a Personal Computer (PC). On most commonly used PCs, commercial processors used include Pentium® and Celeron® processors supplied by Intel Corporation and Athlon® Processors supplied by AMD Corporation. Many other processors are also available. Such processors execute an operating system program such as Windows 95 or Windows 98 provided by Microsoft Corporation, or OS/2 provided by IBM Corporation, or other commercial operating systems. The communication functions are generally accomplished by a communication device such as a modem which provides the conduit or link to the world wide web (WWW) or the Internet or other private network(s).

IRDPU 121 is analogous to output devices may be connected to the computer system such as a Cathode Ray Tube (CRT) Display or monitor, Liquid Crystal Display (LCD) screen, Speakers or Audio outputs and Printers.

IISAU 122 is analogous to input devices on a PC. Examples of input devices include a keyboard, keypad, trackball, mouse, pen and tablet, barcode scanners, MICR scanners, OCR scanners, cameras and sensors. These input devices may be connected to the IRPU 120 via wire based interconnect system or through a wireless connection. It will be recognized that other cursor control and input systems such as voice activated command controls may be used in lieu of or in addition to the keyboard and mouse.

It will be readily realized by those skilled in the art that a PC may contain additional device such as auxiliary storage devices such as Zip disks, DVD disk drive, CD-ROM drive, scanners, cameras, attached to it.

The IDPC 12 has been described herein above as a general-purpose personal computer system having individual sub-components or units including Information Receiving and Processing Unit (IRPU 120), an Information Rendering, Display or Playback Unit (IRDPU 121), and, an Information Input, Selection and Authorization Unit (IISAU 122). It would be realized by those skilled in the art that IDPC 12 can be a special purpose computer system with the sub-components IRPU 120, IRDPU 121 and IISAU 122 corresponding to the processing, output and input modules of the system respectively.

A few examples of IDPCs and subcomponents IRPU, IRDPU and IISAU are shown in Table III.

It is noteworthy that IDPC 12, does not necessarily need to be modular having the above identified sub-components; IDPC 12 can be an integrated device for receiving, ordering and rendering electronic content such as a portable hand-held device like the type sold under popular trade names Palm, Pocket PC, iPaq etc.

A special computer system might have pre-programmed command-button input choices presented on a command console or through a remote-control type command console. It should be understood that the invention is not limited to the particular input or output devices used in combination with the computer system or to those mentioned herein neither is this exemplary list meant to be exhaustive. In addition to input-output devices, the computer system architecture or operating system can be varied and may be implemented in a standalone, networked or embedded configurations.

the user and the distributor through a communication link established between their respective computer systems. For clarity and consistency like parts bear the same reference numerals as FIG. 2. Thus, the distributor's computer system is referred to as the IDC 11 (Information Distribution Center) while the customer's computer system is referred to as IDPC 12 (Information Downloading and Previewing Center).

As detailed hereinabove IDC 11 and IDPC 12 are connected through an interactive communication link IITL 13 (Interactive Information Transmission Link). The communication link itself can be wire based or wireless and utilize telephone, coaxial cable, fiber optics or satellite communication links or networks. It will be apparent to those skilled in the art, that a secure, reliable and trustworthy communication network link, channel or connection is required for effective distribution of digital content and Information Products. The present invention presupposes that such a secure and trusted communication link can be established between IDC 11 and IDPC 12.

The computer systems IDC 11 and IDPC 12 or components thereof are operable in requester and provider modes or functionalities. Thus, for instance, in the requester mode IDPC 12 will request access to a specific Information Product or digital work from the IDC 11; IDC 11, in the provider mode, will process the user's request and thereafter itself switch to the requester mode and request the user for a specified payment amount in exchange of value for the Information Product; IDPC 12 will now, in the provider mode, supply a credit card number for payment of the digital work and so on. This is frequently referred to as client/server architecture, in which, the client (personal computer or workstation) is the requesting machine and the server is the supplying machine, both of which are connected via a local area network (LAN) or wide area network (WAN). In other words, a client is defined as a requester of services and a server is defined as the provider of services. A single machine can be both a client and a server depending on the software configuration.

As listed in Table I and Table II herein above, information products or digital representations of Intellectual Property can take the form of books, graphics, images, music, audio, video, animation, 3D geometry, multimedia works or soft-

TABLE III

Examples of Information Downloading and Previewinig Centers (IDPCs)

| | System: IDPC | IRPU | IRDPU | IISAU |
|---|---|---|---|---|
| 1 | Personal Computer System (PC) | CPU, Memory with upstream communication device such as a modem or DSL/ADSL link. | Monitors, Display, Speakers, Printers. | Keyboard, Mouse or other cursor control device such as voice activated software. |
| 2 | Personal Digital Assistant (PDA) | Processing, display and input units are integrated into one device. | | |
| 3 | Digital Video Disk System (DVD) | DVD Player | Television and Speaker system | Command button console or remote control |
| 4 | Cable TV | Cable Box or TV signal decoder with Coaxial cable link | Television and Speaker system | Command button console or remote control |

Figure 3:
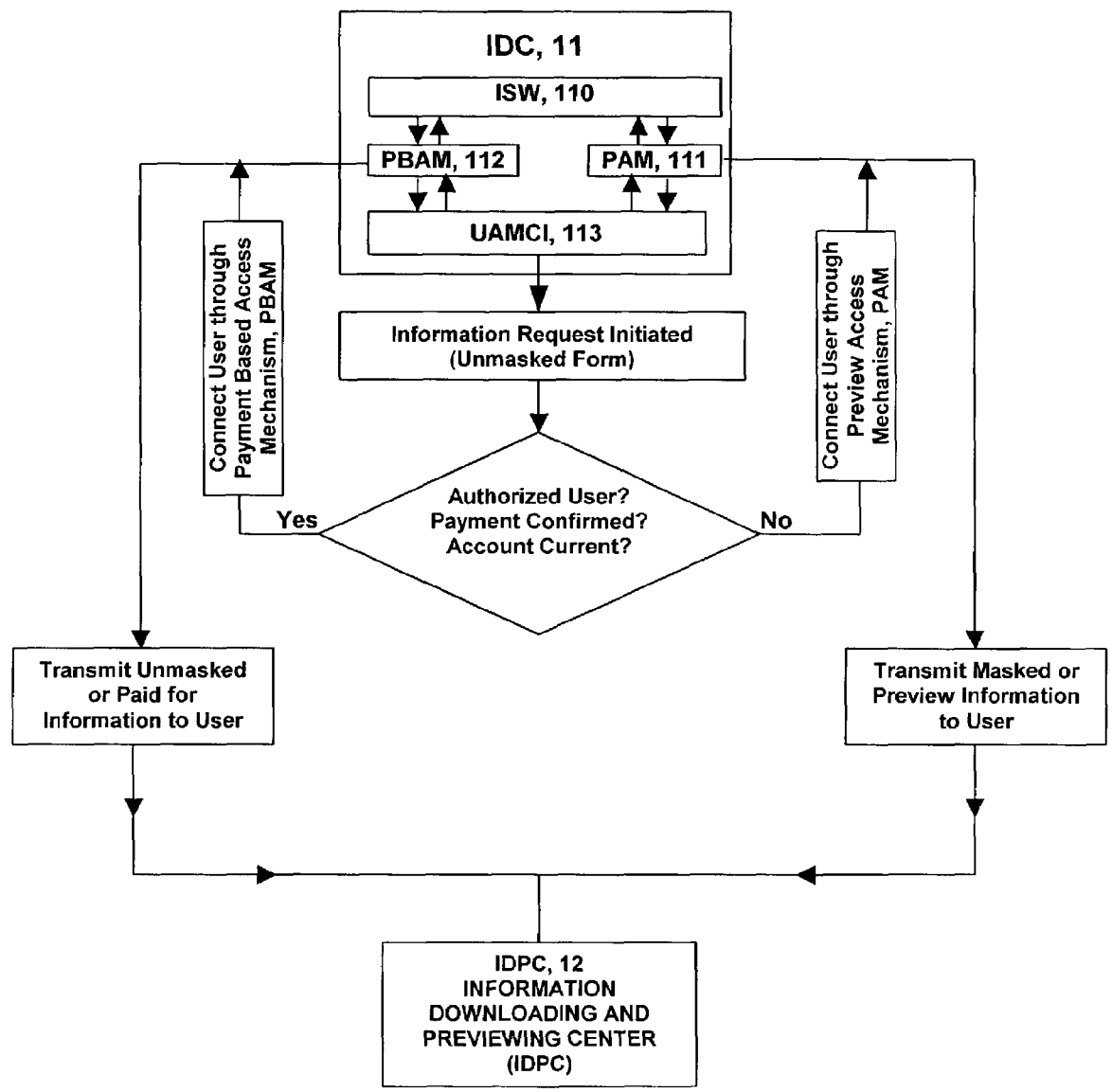
FIG. 3 is a flowchart illustrating the operation of SIDDBS in accordance with an embodiment of the invention.

Referring now to FIG. 3 there is shown, in a flow-chart format, a method for distributing, downloading and previewing information. Essentially FIG. 3 illustrates the basic operation of the present invention and interaction between ware. Also, the composition of an information product can be either homogeneous (consisting of a single data type) or heterogeneous (consisting of a plurality of data elements or content types). As will also be realized by those skilled in the art the information product can be any combination of binary data arranged or structured in a format dependent on data-type, size, content, compression level or other technical criteria.

Figure 4:
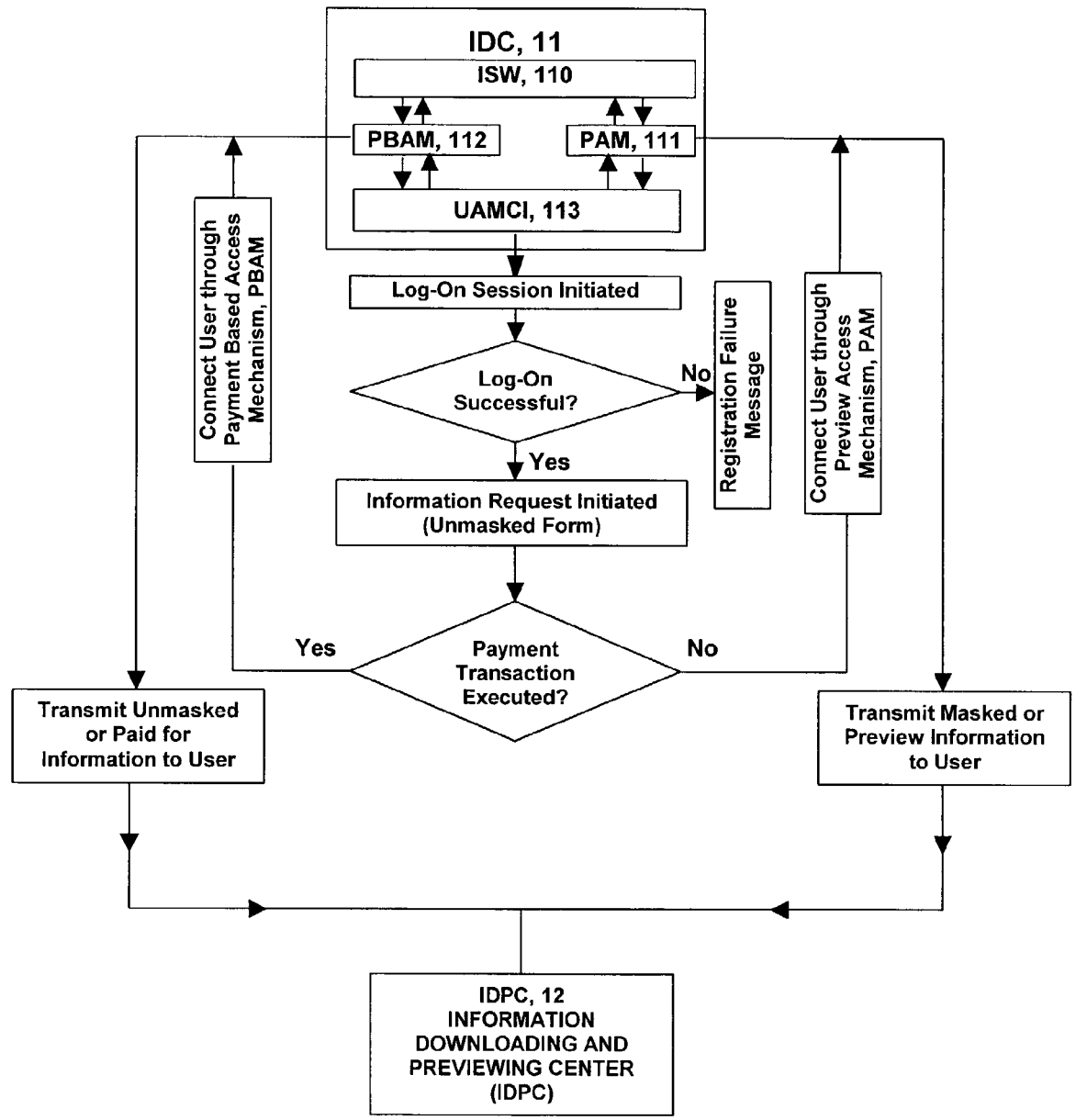
FIG. 4 is a flowchart illustrating the operation of SIDDBS in accordance with another illustrative embodiment of the invention.

All information or information products are stored in the Information Storage Warehouse, ISW 110 and are accessed from the ISW in a pre-controlled manner. ISW 110 can be regarded as the "information bank or "data bank." Exchange or distribution of information from ISW 110 occurs in accordance with the "exchange rate or value" assigned to a given "information product" and under specific guidelines or criteria established by the distributor. Exemplary criteria are shown in FIG. 3 and FIG. 4, wherein the customer can gain access to the original content stored in ISW 110 by paying for it through a Payment Based Access Mechanism, PBAM 112. Alternately, the customer can acquire content from ISW 110 using a Preview Access Mechanism, PAM 111. PAM 111 ensures that the customer receives the original content from ISW 110 in a masked or reduced utility configuration for purchase decision purposes.

The Interactive Information Transmission Link IITL 13 is used to establish a connection with the User Authorization Mechanism and Commerce Interface, UAMCI 113. Once a successful link has been established with UAMCI 113, the user proceeds to request a specific information product or title from IDC 11. The commerce interface module of UAMCI 113 processes the information request in accordance with predetermined conditions that must be met for specific access type. Thus, UAMCI 113 acts as the gateway to the ISW 110. The functionalities of the UAMCI 113 may include processing information requests and payment transactions, generating billing information, confirming that the credit card information provided by the user is genuine by confirmation of billing address associated with a credit card number or other third party authentication mechanisms. Upon successful completion of the authorization step and confirmation of payment conditions, the user is provided access to the information product request through the Payment Based Access Mechanism, PBAM 112 and receives the original, paid-for version of the information or digital work requested.

In case of failure of the Payment transaction or the user's interest in a preview version of the requested information, the user is directed through Preview Access Mechanism, PAM 111 and receives a masked version of the information product.

It will be recognized by those skilled in the art, that the primary purpose of providing free access to information or products thereof in a "masked" or "reduced-utility" configuration is to NOT diminish or compromise its sale value. The level of "utility reduction" or "masking" for preserving the sale value of information or products thereof is dependent on:

Type of information product (movie, music, book etc.)

Selective superposition of masking effects on the various body elements of an information product; wherein, certain portions or regions of the information product or specific data elements in the information product are selectively masked or disabled for reading, display or playback.

The composition of the digital content (text, graphics, photographs, audio and/or video).

FIG. 4 shows another embodiment of the distribution, downloading and previewing system. Once again, like parts bear like reference numerals. In this embodiment, the Interactive Information Transmission Link IITL 13 is used to establish a connection with the User Authorization Mechanism and Commerce Interface, UAMCI 113.

In the most generic terms, UAMCI 113 is the mechanism whereby the user interacts with the IDC 11 and invokes monetary transactions and gains access to Information or products thereof. At a minimum, the UAMCI 113 will process alpha numeric input provided by the user and provide transaction status feedback and then initiate access in accordance with the user's request for information and user's transaction status. The implementation and appearance of UAMCI 113 will vary according to the design and functionality preferred by the distributor.

A typical UAMCI may include various interactive facilities for various functions or user-approach conditions, which may be organized as interface modules. In the current illustrative embodiment the interface modules or facilities are:

a Log-on facility (LF);
a Registering Facility (RF)
an Information Request and Selection Facility (IRSF);
a Transaction Processing and Feedback Facility (TPFF);

In addition, the UAMCI 113 will most likely be capable of storing, retrieving and checking against stored User Profiles, Log-on Information and Demographic Data.

The Log-on Facility may be the primary session initiation procedure that the user encounters for confirming his/her registration status. Session initiation procedures and requirements may be established by the distributor and implemented through the Log-on Facility in the UAMCI 113. Session initiation procedure might have a registration prerequisite, requiring the user to have a pre-assigned "USER ID" and "PASSWORD" or "Access Code".

If the USER ID and/or PASSWORD input is incorrect the user gets an error message and is directed to retrieving USER ID and PASSWORD data by alternate methods. If the user is not a registered user, the user is directed to the Registering Facility (RF).

Once the UAMCI 113 receives matching "USER ID" and "PASSWORD" information, the customer is cleared to proceed to the Information Request and Selection Facility (IRSF). The IRSF provides functionality for the user to search for Information and Information Products using the search and browsing functions. The content can be organized by Titles such as name of movies, books, audio albums and the like; by content type such as text, audio, video, software etc.; or by product type such as movies, books, music-audio, music video, news etc. Alternately, the user may input alphanumeric data for requesting a particular Information Product. Thus, the user has various options for choosing and selecting content to purchase or receive. The information request is initiated by the selection of an information product and receipt of a verifying signal from the user which may be a mouse-click on a command button or a key-board stroke or an audio-command.

Next the user is sent to the Transaction Processing and Feedback Facility (TPFF) where the user chooses a variety of payment options or a non-payment option.

The user may choose one of his/her preferred method of paying and input the required credit card, bank a/c or other data depending on the payment option selected. Upon clearance of funds and receipt of payment, the user is notified and allowed the option of printing a record of the transaction. Thereafter, the user is cleared to proceed to Payment Based Access Mechanism whereby the user downloads the item(s) purchased.

A non-payment Information Request diverts the user to the Preview Access Mechanism PAM 111 and the user is allowed to download a masked version (reduced-utility version) of the items selected free of charge.

It will be realized that having a masked version for free and uncompensated distribution purposes relieves the IDC 11 of payment processing and monetary transactions for delivery of masked or reduced-utility electronic content and a simplified version of IDC 11 can be set-up for delivering only masked content while Payment Based Transactions can be assigned to a separate computer system or distribution unit.

Also, in addition to the free and uncompensated primary distribution of masked content from one Information Distribution Center (IDC), the publisher(s) or distributor(s) may choose to allow unrestricted secondary distribution of the masked content between users, secondary distributors and other content providers (while retaining rights for authentication, selling and unmasking of electronic content). This limits the load on the IDC for Information requests as the same digital work or content can be accessed and downloaded in a masked configuration from a variety of content providers. This is a considerable advantage, as those skilled in the art would realize that the speed of accessing or downloading content (bits downloaded per unit time) is inversely proportional to the number of users requesting access and the information carrying capacity of the link. Thus, if all downloaded requests are routed through a single unit, downloads will be lot slower compared to routing them through multiple connection points.

Representing electronic content in a lower-utility masked configuration directly yields the advantage of freely available content for purchase evaluation purposes from multiple access locations and sources without relinquishment of control by the original source, for purchase or authorized and unmasked rendering of Information and products thereof.

Referring now to FIG. 5*a* through FIG. 5*f*, there is shown a representative information product 50 in various unmasked and masked configurations wherein like reference numerals represent like parts.

It will be recognized by persons skilled in the art, that information product 50 will typically be in the format of a file or a similar logical entity which is capable of being recreated, accessed, called, read, displayed or played-back through an interpretive software program, installed on suitable hardware, and will be displayed through standard computer peripheral display and playback devices, such as, a monitor and speakers. For the purposes of this discussion, information product 50 can be assumed to be stored on a remote computer server and being accessed via a network connection. It will be readily recognized that it may as readily be stored locally or on a CD-ROM or similar storage media.

Figure 5A:
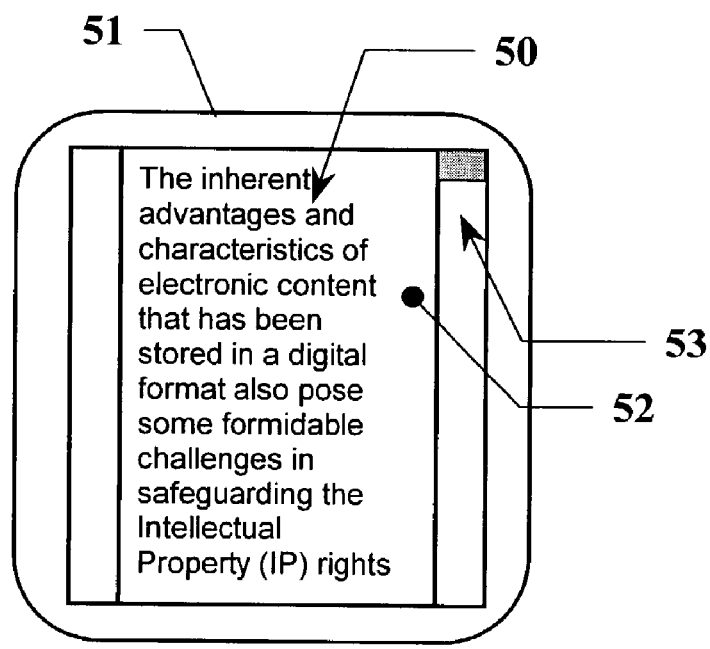
FIG. 5a illustrates an information product in its original and unmasked configuration.

FIG. 5*a* shows information product 50 being displayed on a display peripheral 51 in its unmasked, original and intended form. The display peripheral 51 has a screen 52 where the actual electronic content is displayed. Screen 52 is essentially an electronic content display window. It will be readily apparent that the display peripheral 51 can be a monitor, a CRT terminal or similar display device and may in addition be equipped with speakers or other voice output devices. The display peripheral 51 is connected to a suitable computing device or computer that has the ability of storing, processing and displaying information product 50. Although, as displayed information product 50 contain written text, it would be recognized that the representative data elements making up information product 50 can be characters, strings, arrays, text, graphics, video or any other data form. Various areas of the information product 50 can be accessed and displayed on the screen 52 by using the scroll bar 53.

In FIG. 5*a*, the information product 50 is shown in the original and intended form and in its full-utility or unmasked configuration. The content as shown in FIG. 5*a*, is the intended content that the user will receive or connect-to upon payment of due consideration. The means for exchanging payments and conducting money/financial transactions electronically over a secure network environment are well know in the art and are commonly encountered at various websites accessible throughout the World Wide Web or the Internet. Such websites, which accept credit cards and other payment means, are frequently referred to as e-commerce enabled websites.

FIG. 5*b* through FIG. 5*f* show illustrative examples of various masks or masking effects, which are superposed over original information product 50 to render same in reduced utility configuration(s). These illustrative masks interfere generally with the exhibition, display, printing, and/or playback of the information product 50 that appears on the screen 52.

Figure 5B:
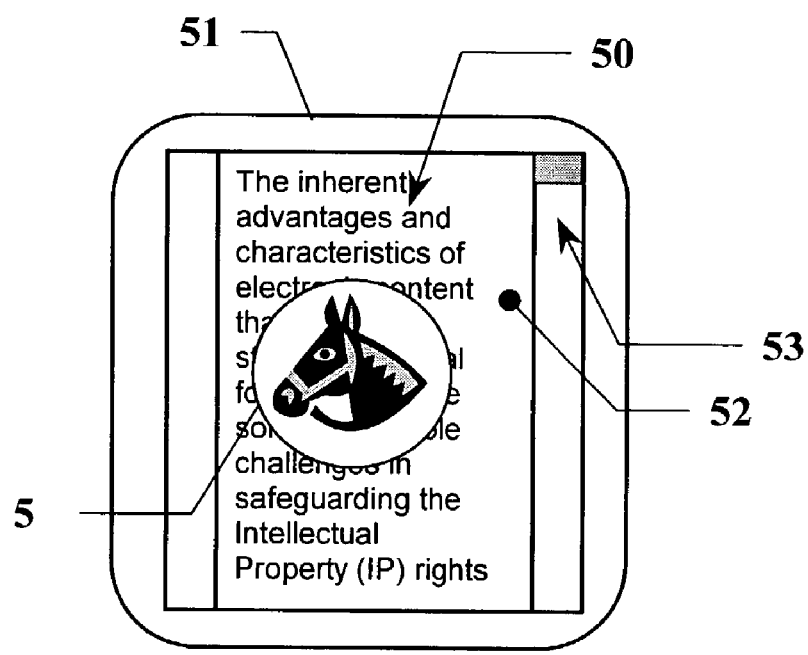
FIGS. 5b through 5f are examples of information products shown in masked or reduced utility configurations with various mask variants.

In FIG. 5*b*, information product 50 is shown in a masked configuration carrying a mask 54. Mask 54 is superposed over the displayed portion of the information product 50 on screen 52. Mask 54 acts as a masking overlay and partially hides a portion of the information product 50 that is displayed on screen 52. As shown in FIG. 5*b*, Mask 54 is opaque, has a sharply defined boundary and shows a graphic centrally located within the boundary. Mask 54 may be superposed on the information product 50 in a stationary manner and generally masking a pre-determined area or display region of screen 52. Alternatively, Mask 54 can be devised to be dynamic and in constant motion throughout the various areas of display screen 52 on which the electronic content is displayed.

Figure 5C:
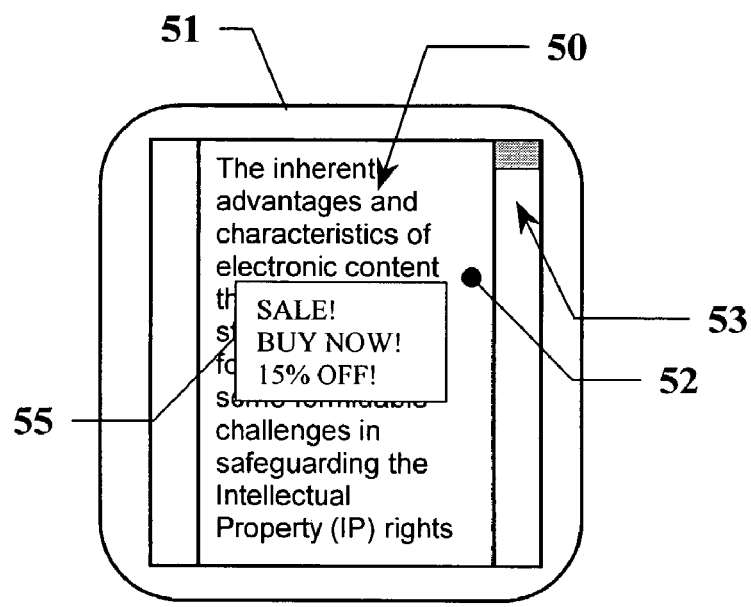

In FIG. 5*c*, information product 50 is shown in a masked configuration carrying a "content overlay" or mask 55. Mask 55 is superposed on the displayed region of information product 50 and also displays additional electronic content. The electronic content displayed by Mask 55 may be either related to or completely unrelated to the information product 50. Thus, for example the mask 55 can contain marketing information about information product 50, which touts for e.g. the bestseller status of the document, or reviews by other readers, or information about the author, editor or publisher. Other examples of meaningful marketing content would be an HTML link to the order page for rapid access to the purchase page should the user decide to purchase information product 50 at any given time while reviewing a masked version of information product 50. The mask could also contain very targeted advertising or commercial material that relates directly to the underlying content, for example information product 50 might be available in various multimedia formats, which can be purchased in an integrated or separate manner at user's option. Thus, all the peripheral buying decision information can be made available through a content mask. In the above examples, the content mask acquires a dual functionality of masking information product 50 while at the same time providing information about the document and its purchase to the user.

Figure 5D:
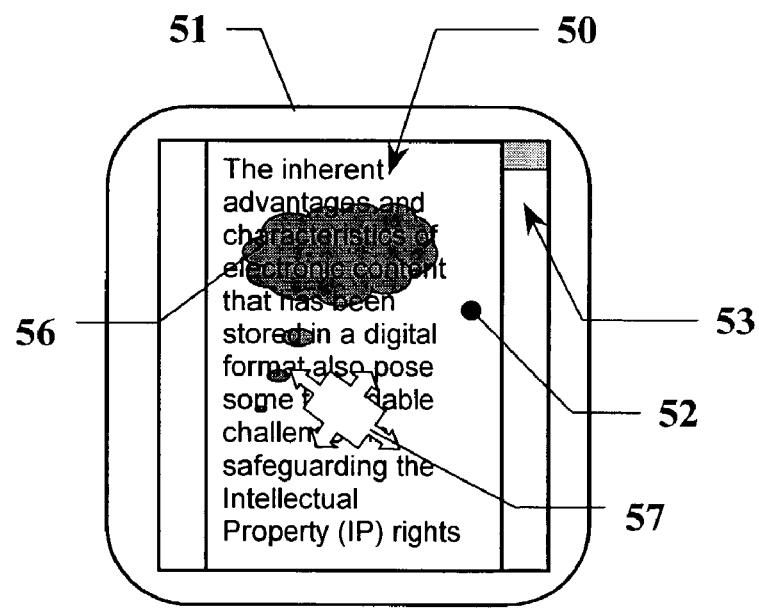

In FIG. 5*d* a plurality of masking elements are employed for masking information product 50. Specifically, masking elements 56 and 57 are shown disposed at separate locations on screen 52. Masking elements can have varying characteristics, whereas mask 56 is shown as a semi-transparent mask, and mask 57 is shown as opaque.

Figure 5E:
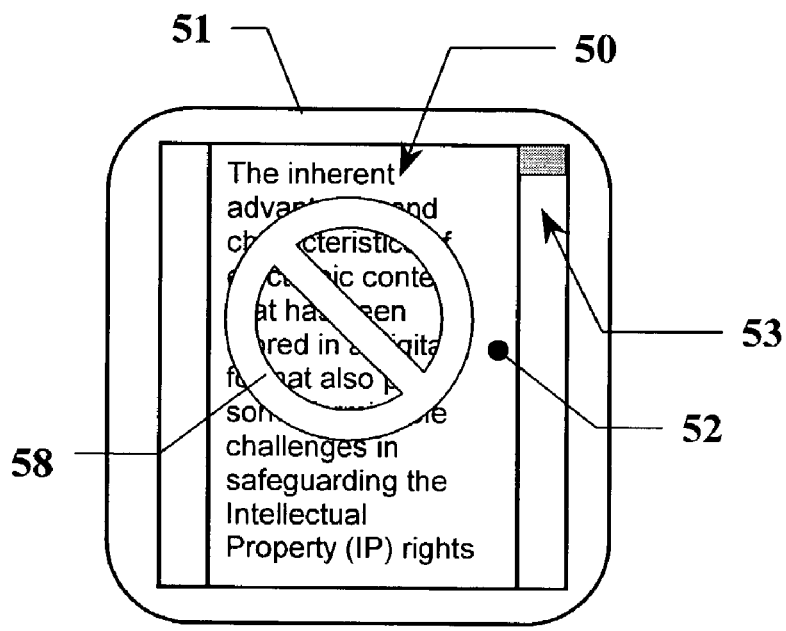

In FIG. 5e there is shown a masking element or mask 58 superposed over information product 50. Mask 58 is characterized by alternating opaque and semi-transparent regions.

Figure 5F:
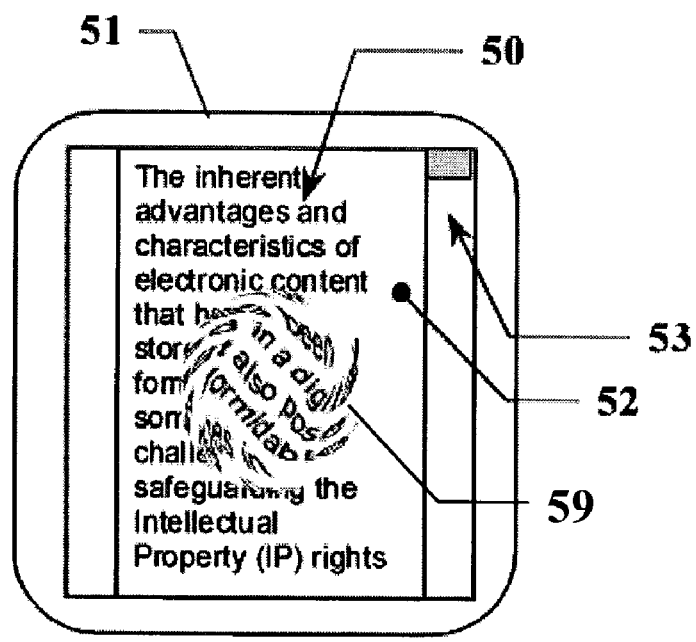

In FIG. 5f there is shown a masking effect 59, which distorts the displayed information product 50 at certain region(s) of screen 52. Alternately masking effect 59 can be rendered as a waveform wherein a content-distorting wave or ripple propagates through the displayed content on screen 52 at a certain frequency. Again, the purpose of distorting-waveforms is to interfere with the wholesome enjoyment of information product 50.

From the above it is readily seen that a variety of embodiments and distribution control schemes can be devised by utilizing masking effects for controlling distribution.

In general, masks or masking effects are applied or superposed over an information product and adapted to cause an interference, interruption, distortion, discontinuity, disorientation, blurring, screening, veiling and/or hiding of at least a portion of the displayed electronic content. Masking effects are superposed for providing a preview of the underlying original content but in manner that only suffices for purchase-evaluation purposes and detracts from the wholesome utilization or enjoyment of the digital content. Masks or masking effects reduce the utility of the original electronic content and yet allow the user to make a purchase decision. The masking effect is readily removed or removable once the customer has met the predetermined criteria or conditions for access and/or purchase of the content.

Alternately, the masking effects can be applied in a permanent manner to derive a masked information product. The masked information product can be used for marketing and generating sales for the original information product. The masked information product can be distributed in an unrestricted manner and made readily accessible.

The presence, absence, permanence or duration of application for a masking effect is controllable in accordance with the outcome of interactions between the distributor and the receiver. In one embodiment of the invention the removal of a superposed masking effect requires purchase of an information product. In another embodiment of the invention the masking effect can be turned permanent when tampering with the masking effect is detected.

The level, extent or degree of masking can be controlled by the distributor. In one embodiment of the invention the masking effect is in the form of a plurality of masking layers which can be switched ON of OFF to provide light or heavy masking.

According to another embodiment of the invention a plurality of masking effects may be separately superposed on a main information product to provide a plurality of masked information products. The plurality of masked information products are adapted for previewing by a plurality of audience group in accordance with their preview preferences. The superposition of a specific masking effect corresponding to a specific audience group renders a specific masked information product specifically targeted and tailored for that specific audience group for making a purchase decision. For instance, when considering purchase of movie potential buyers would be motivated to purchase based on their subjective content preferences such as action, comedy, drama, music and special effect etc. Tailoring a preview version for a specific audience group will result in more-informed decision by the potential buyer.

In one specific embodiment of the invention the masking effect is in the form of a plurality of overlays that are displayed at various locations of the information product during its recreation or playback. Overlays are essentially "perceptible masking objects" displayed over electronic content. Overlays can be in the form of continuous overlay or a plurality of overlay objects dispersed throughout the information product. The overlays are adapted to either static or dynamic. The overlays can themselves be mini-information objects carrying electronic content in the form of written text, drawings, images, animation, audio-visual content etc.

In another embodiment of the invention the masking effect is in the form of an "interruptive waveform" or an "interference" or a "noise signal" that is applied to audio or video content portions of the information product. The interruptive waveform can be continuous so that it appears throughout the playback of the information product or it may be discontinuous and appearing only at pre-selected intervals for pre-selected durations. The frequency with which the interruptive waveform or pattern repeats itself on the information product, and the duration of the interruption period during which such interruptive waveform is present on the information product are variables that can be controlled by the distributor and adapted for a particular type of content.

Masking effects in the form of "interruptive or distortive waveforms" or "noise signals" that propagate through the displayed content at pre-determined frequency are particularly suitable for audio or video content and can appear at pre-selected intervals for pre-selected durations. Thus, the masking effect as an interruptive waveform can be also controlled chronologically during a playback of a movie, an audio recording, a video recording or a multi-media work. An interruptive waveform or interference can have an audio-interference component and a visual-interference component, which can be respectively superposed over audio and visual components of an information product.

In still another embodiment of the invention the masking effect is in form of a perceptible interference wave that traverses through a portion of the display screen during recreation of an information product. It will be recognized by those skilled in the art that masking effects can be general or selective. In other words the masks or masking effects may be displayed at an arbitrary region of the display window or terminal or they may be selectively attached to pre-determined portions of the electronic content. Masks are adapted to be stationary or dynamic. In other words, masks can cause interference at a specific stationary location relative to the displayed content or actually move around the display window.

Masks can have a variety of shapes and sizes having sharply defined or undefined boundaries. Masks can be white, colored, hued, opaque or transparent. Masks can have regions that have varying even opposing features, colors, opacity or behavior.

Masking effects or masks can be considered as mini-information objects superposed over the information product and containing electronic content in the form of text, images, graphics, photos, audio and/or video. Masks can serve additional functions by carrying/displaying additional content related to the original electronic content such as marketing information, purchase information, links to the order page, links to selected areas in the electronic content, special sale offers, very-targeted advertising media etc.

Masking effects can be in the form of micro signatures that are added to the content to keep track of transmission history and record the transmission and distribution process and that gets updated every time a document is transferred, retrieved and transmitted from one computer system to another.

In another embodiment of the invention the masked version of an information product, obtained by superposing a masking effect, is rendered the default version of the information product. The information product persists in its masked state until a mask-removal procedure is carried out on the information product. The mask-removal procedure may require authentication or approval by the distributor prior to the recreation of the information product in its original and intended form. Once an authentication or mask-removal procedure has been successfully carried out the user can read, watch or listen to the information product but cannot store the information product in its original and intended form; thereafter the information product reverts to its default masked state and re-access to the information product again requires an authentication or approval by the distributor.

It would be readily apparent to those skilled in the art that various alterations, modifications and adaptations can be made to this invention without departing from the spirit and scope of the invention.

The invention claimed is:

1. A method for allowing a user to preview an information product, said method comprising the steps of:
providing a preview version of said information product; said preview version being created by superposing a masking effect on an original form of said information product, said preview version being readily accessible and remaining representative of said original form of said information product and enabling said user in evaluating said information product for making a purchase decision, said masking effect being superposed on a region of said information product and adapted to interfere with receiving of said information product in said original form by said user;
allowing said user to access said preview version of said information product; and
controlling at least one of—presence, absence, duration of application and permanence of said masking effect, superposed on said information product, in accordance with at least one criterion thereby controlling receiving of said information product in said original form by said user.

2. A method as in claim 1, wherein said information product is at least one of a printable matter, a video recording, an audio recording, a movie, a song, an image, a software program, an interactive game and a multimedia work.

3. A method as in claim 1, wherein said masking effect is adapted to cause at least one of an interruption of-, a discontinuity of-, an interference with-, a disorientafion of-, an overlay on-, a blurring effect on-, an overlay window on-, a superposition on, a screen on-, a noise signal on-, and a veil on- said information product.

4. A method as in claim 1, wherein said masking effect is in the form of an overlay, said overlay comprising electronic content; said electronic content comprising at least one of—a written text, an image, a video recording, an audio recording, a movie, a song, a software program, a commercial message, an interactive game and a multimedia work.

5. A method as in claim 1, wherein said masking effect is adapted to be stationary.

6. A method as in claim 1, wherein said masking effect is adapted to be dynamic.

7. A method as in claim 1, wherein said information product is a multimedia work having both audio content and visual content and said masking effect is in the form of an audio-visual overlay having an audio-interference component and a visual-interference component; said audio-visual overlay being manifested during a playback of said multimedia work on a visual display device and a speaker.

8. A method as in claim 7, wherein said visual-interference component of said audio-visual overlay is targeted to only a portion of the display region on said visual display device during said playback of said multimedia work.

9. A method as in claim 7, wherein said audio-interference component of said audio-visual overlay is applied intermittently at pre-selected intervals and for pre-selected durations during the playback of said multimedia work.

10. A method as in claim 1, wherein said permanence of said masking effect is forced upon said information product upon detection of tampering with said masking effect.

11. A method as in claim 1, wherein said step of allowing said user to access said preview version of said information product is conducted over an interactive information transmission link.

12. A method as in claim 1, wherein said step of controlling at least one of—presence, absence, duration of application and permanence of said masking effect being in accordance with the outcome of an interactive communication between a provider of said preview version of said information product and said user.

13. A method as in claim 1, wherein said preview version of said information product is characterized by its ability to be tailored and customized in accordance with at least one preview preference of said user.

14. A method as in claim 1, comprising the additional step of releasing said information product in said original form to said user upon receipt of due consideration therefor.

15. A method for reducing the utility of an original unmasked version of an information product, for previewing, browsing and distribution control purposes, said method comprising the steps of:
providing a reduced-utility version of said information product over an interactive medium; said reduced-utility version being created by superposing a masking effect on said original unmasked version of said information product in the form of an overlay superposed on a region of said original unmasked version of said information product; said reduced-utility version of said information product remaining representative of said original unmasked version of said information product, and allowing a user to browse through and preview said information product; said masking effect being adapted to interfere with at least one of viewing, hearing, displaying and playing of said original unmasked version of said information product;
allowing said user to access said reduced-utility version of said information product: and
controlling at least one of—presence, absence, duration of application and permanence of said masking effect in accordance with the outcome of an interactive communication between a provider of said reduced-utility version of said information product and said user.

16. A method as in claim 15, wherein said information product is selected from a group consisting of printable matter and books.

17. A method as in claim 15, wherein said information product is selected from a group consisting of audio recordings and songs.

18. A method as in claim 15, wherein said information product is selected from a group consisting of video recordings, movies and multimedia works.

19. A method as in claim 15, wherein said information product is selected from a group consisting of software programs, interactive games and multimedia works.

20. A method as in claim 15, wherein said masking effect is adapted to cause at least one of—an interference with-, a discontinuity of-, a distortion of-, a disturbance of-, and an interruption of- said original unmasked version of said information product.

21. A method as in claim 15, wherein at least one of—type, nature, behavior and extent of said masking effect is controllable by said provider of said reduced-utility version of said information product.

22. A method as in claim 15, wherein said masking effect is characterized by its ability to be tailored in accordance with at least one preview preference of said user.

23. A method as in claim 15, wherein said overlay comprises electronic content said electronic content being related to said information product.

24. A method as in claim 15, wherein said overlay comprises electronic content, said electronic content being unrelated to said information product.

25. A method as in claim 15, wherein said overlay contains at least one of -marketing information, a commercial message, and an advertisement.

* * * * *

UNITED STATES PATENT AND TRADEMARK OFFICE
CERTIFICATE OF CORRECTION

PATENT NO. : 7,316,032 B2 Page 1 of 1
APPLICATION NO. : 10/307832
DATED : January 1, 2008
INVENTOR(S) : Amad Tayebi It is certified that error appears in the above-identified patent and that said Letters Patent is hereby corrected as shown below:

<u>Title page #60---Related U.S. Application Data</u>

Should read---"Provisional Application No. 60/339,015 filed Dec. 1, 2001".

<u>Column 1 line 12</u>

Should read---"Provisional Application No. 60/339,015 filed Dec. 1, 2001".

Signed and Sealed this

Twenty-sixth Day of January, 2010

David J. Kappos
*Director of the United States Patent and Trademark Office*